(12) United States Patent
Bardini et al.

(10) Patent No.: US 7,154,910 B2
(45) Date of Patent: Dec. 26, 2006

(54) METHOD FOR ANY SPEED DUBBING USING ISOCHRONOUS PACKETS ON ISOCHRONOUS CHANNELS OR ON ASYNCHRONOUS STREAMS OVER AN IEEE 1394-2000 SERIAL BUS NETWORK

(75) Inventors: Richard A. Bardini, Los Gatos, CA (US); Glen Stone, Los Gatos, CA (US); Bruce Fairman, Woodside, CA (US); Scott Smyers, San Jose, CA (US)

(73) Assignees: Sony Corporation, Tokyo (JP); Sony Electronics Inc., San Diego, CA (US)

( * ) Notice: Subject to any disclaimer, the term of this patent is extended or adjusted under 35 U.S.C. 154(b) by 1013 days.

(21) Appl. No.: 10/091,636

(22) Filed: Mar. 5, 2002

(65) Prior Publication Data

US 2003/0169772 A1    Sep. 11, 2003

(51) Int. Cl.
*H04J 3/24* (2006.01)
(52) U.S. Cl. ........................ 370/474; 370/476
(58) Field of Classification Search .................. None
See application file for complete search history.

(56) References Cited

U.S. PATENT DOCUMENTS

| | | | |
|---|---|---|---|
| 5,052,029 A | 9/1991 | James et al. | 375/107 |
| 5,400,340 A | 3/1995 | Hillman et al. | 370/105.3 |
| 5,434,860 A | 7/1995 | Riddle | 370/84 |
| 5,463,620 A * | 10/1995 | Sriram | 370/412 |
| 5,541,926 A * | 7/1996 | Saito et al. | 370/474 |
| 5,561,670 A | 10/1996 | Hoffert et al. | 370/94.1 |
| 5,619,544 A | 4/1997 | Lewis et al. | 375/377 |
| 5,809,022 A * | 9/1998 | Byers et al. | 370/395.51 |
| 5,832,245 A | 11/1998 | Gulick | 395/309 |
| 6,178,184 B1 * | 1/2001 | Petty | 370/503 |
| 6,335,933 B1 | 1/2002 | Mallory | 370/394 |
| 6,480,511 B1 * | 11/2002 | Petty | 370/509 |
| 6,717,947 B1 | 4/2004 | Ghodrat et al. | 370/395.1 |
| 6,728,261 B1 * | 4/2004 | Sasson et al. | 370/466 |
| 6,744,772 B1 * | 6/2004 | Eneboe et al. | 370/400 |
| 6,904,049 B1 * | 6/2005 | Maeda | 370/421 |
| 6,963,561 B1 * | 11/2005 | Lahat | 370/356 |

OTHER PUBLICATIONS

"P1394 Standard For A High Performance Serial Bus," IEEE, 1995, pp. 1-384.

(Continued)

*Primary Examiner*—Chau Nguyen
*Assistant Examiner*—Jordan Hamann
(74) *Attorney, Agent, or Firm*—Haverstock & Owens LLP

(57) ABSTRACT

A data transmission method configures a source plug on a source device and a destination plug on a destination device for respectively transmitting and receiving isochronous data packets in non real-time. A stream of non real-time isochronous data packets is formed by first packetizing the data stream into conventional real-time isochronous data packets. Then, either a partial real-time isochronous data packet or multiple real-time isochronous data packets are encapsulated within a data payload portion of a non real-time isochronous data packet depending on the transmission speed. If the transmission speed is less than real-time, then a partial real-time isochronous data packet is encapsulated within the non real-time isochronous data packet. If the transmission speed is greater than real-time, then multiple real-time isochronous data packets are encapsulated within a single non real-time isochronous data packet. The stream of non real-time isochronous data packets is transmitted from the source device via the source plug to the destination device via the destination plug.

51 Claims, 8 Drawing Sheets

OTHER PUBLICATIONS

"The IEEE—1394 High Speed Serial Bus", R.H.J. Bloks, Philips Journal of Research, vol. 50., No. 1/2, pp. 209-216, 1996.

"A Bus on a Diet—The Serial Bus Alternative. An Introduction to the 1394 High Performance Serial Bus", Michael Teener, CompCon92, Feb. 1992, pp. 316-321.

"Digital Transmission Content Protection Specification", vol. 1 (Informational Version), Feb. 25, 2002, pp. 1-67.

"Digital Interface for Consumer Audio/Video Equipment", Netherlands National Committee, (English text), publication date; May 27, 1997.

* cited by examiner

METHOD FOR ANY SPEED DUBBING USING ISOCHRONOUS PACKETS ON ISOCHRONOUS CHANNELS OR ON ASYNCHRONOUS STREAMS OVER AN IEEE 1394-2000 SERIAL BUS NETWORK

FIELD OF THE INVENTION

The present invention relates to the field of transmitting data in non real-time. More particularly, the present invention relates to the field of transmitting data in non real-time using isochronous packets on isochronous channels or on asynchronous streams.

BACKGROUND OF THE INVENTION

A standard adopted by the Institute for Electrical and Electronics Engineers (IEEE), "IEEE 1394-2000 Standard For A High Performance Serial Bus," is an international standard for implementing an economical high-speed serial bus architecture. This standard provides a universal input/output connection for interconnecting digital devices including, for example, audio-visual equipment and personal computers.

The IEEE 1394-2000 standard supports both asynchronous and isochronous format data transfers. Asynchronous transfers are data transfer operations which transfer data from a source node to a destination node and take place as soon as permitted after initiation. An example of an application appropriate for asynchronous data transfer is communication of a still image or text document. Control commands can also be sent asynchronously.

Isochronous data transfers are real-time data transfers which take place such that time intervals between significant instances have the same duration at both the transmitting and receiving applications. An example of an application suitable for the transfer of data isochronously is the transfer of audio-visual data (AV data) between devices, such as a video camera and a television set. The video camera records sounds and images (AV data) and stores the data in discrete segments on tape. The data payload included in each packet represents the image and/or sound recorded over a limited period of time. The video camera then transfers each segment in a packetized manner during an appropriate interval for reproduction by the television set. In this manner, a transmitted sequence of related isochronous data packets constitutes an AV program, such as a television program or a motion picture.

The IEEE 1394-2000 standard bus architecture provides multiple channels for isochronous data communication between applications. A six-bit channel number is broadcast with the data to allow reception by the appropriate application. This allows multiple applications to concurrently communicate isochronous data across the bus structure without interfering with each other.

The cable required by the IEEE 1394-2000 standard is relatively thin in size compared to other bulkier cables used to connect such devices. The IEEE 1394-2000 cable environment is a network of nodes connected by point-to-point links, each link including a port for each node's physical connection and the cable between them. The physical topology for the cable environment of an IEEE 1394-2000 serial bus is a non-cyclic network of multiple ports, with finite branches. A primary restriction on the cable environment is that nodes must be connected together without forming any closed loops.

Devices can be added and removed from an IEEE 1394-2000 bus while the bus is active. If a device is so added or removed, the bus automatically reconfigures itself for transmitting data between the then existing nodes. A node is considered a logical entity with a unique address on the bus structure. Each node provides an identification ROM, a standardized set of control registers and its own address space.

The IEEE 1394-2000 cables connect ports together on different nodes. Each port includes terminators, transceivers and logic. A node can have multiple ports at its physical connection. The cable and ports act as bus repeaters between the nodes to simulate a single logical bus. The cable physical connection at each node includes one or more ports, arbitration logic, a resynchronizer and an encoder. Each of the ports provide the cable media interface into which the cable connector is connected. The arbitration logic provides access to the bus for the node. The resynchronizer takes received data-strobe encoded data bits and generates data bits synchronized to a local clock for use by the applications within the node. The encoder takes either data being transmitted by the node or data received by the resynchronizer, which is addressed to another node, and encodes it in data-strobe format for transmission across the IEEE 1394-2000 serial bus. Using these components, the cable physical connection translates the physical point-to-point topology of the cable environment into a virtual broadcast bus, which is expected by higher layers of the system. This is accomplished by taking all data received on one port of the physical connection, resynchronizing the data to a local clock and repeating the data out of all of the other ports from the physical connection.

The IEEE 1394-2000 standard defines a protocol as illustrated in FIG. 1. This protocol includes a serial bus management block 10 coupled to a transaction layer 12, a link layer 14 and a physical layer 16. The physical layer 16 provides the electrical and mechanical connection between a device or application and the IEEE 1394-2000 cable. The physical layer 16 also provides arbitration to ensure that all devices coupled to the IEEE 1394-2000 bus have access to the bus as well as actual data transmission and reception. The link layer 14 provides data packet delivery service for both asynchronous and isochronous data packet transport. This supports both asynchronous data transport, using an acknowledgment protocol, and isochronous data transport, providing real-time guaranteed bandwidth protocol for just-in-time data delivery. The transaction layer 12 supports the commands necessary to complete asynchronous data transfers, including read, write and lock. The serial bus management block 10 contains an isochronous resource manager for managing isochronous data transfers. The serial bus management block 10 also provides overall configuration control of the serial bus in the form of optimizing arbitration timing, guarantee of adequate electrical power for all devices on the bus, assignment of the cycle master, assignment of isochronous channel and bandwidth resources and basic notification of errors.

The IEEE 1394-2000 standard defines a structured packet into which information is encapsulated for isochronous transfer upon the bus. Each isochronous data packet includes at least an IEEE 1394-2000 packet header. The packet header includes overhead information necessary for proper communication of the packet. Typically, content data, such as audio-visual data, is included in the packet, in a data field following the packet header. When an isochronous data packet is received, the receiving device must generally separate the header information from the content data so that the content data can be appropriately processed, such as for display. In addition, due to timing considerations, isochronous packets which include only header information and no content data portion are occasionally communicated via an IEEE 1394-2000 bus.

IEEE 1394-2000 isochronous data packets are transmitted over isochronous channels using isochronous arbitration or over asynchronous streams using asynchronous arbitration. Transmitting over isochronous channels, an isochronous data packet is transmitted only during the isochronous period. The isochronous period is controlled by the cycle master, which signals the start of the period with a cycle start packet. The period ends when a subaction gap is observed, which happens after all isochronous transmitters have had a chance to transmit. Two resources, bandwidth and channel number, are allocated from the isochronous resource manager registers BANDWIDTH_AVAILABLE and CHANNELS_AVAILABLE, respectively. For a given channel number, no more than one transmitter can transmit an isochronous data packet with that channel number each isochronous period.

Using asynchronous streams, some of the aforementioned requirements related to transmitting isochronous data packets over isochronous channels are relaxed. Transmitting over asynchronous streams, an isochronous data packet is transmitted during the asynchronous period, subject to the same arbitration requirements as other request subactions. The channel number is allocated from the isochronous resource manager register CHANNELS_AVAILABLE. Multiple nodes can transmit isochronous data packets with the same channel number or the same node can transmit multiple isochronous data packets with the same channel number as often as desired, subject to arbitration fairness.

The IEEE 1394-2000 standard does not specify particular formats for the content data of the data field. Rather, the organization of content data in accordance with a particular format and the interpretation of data field contents are functions of the transmitting and receiving applications, respectively. In order to facilitate interoperability between a wide range of digital devices, data fields should encapsulate data in accordance with a standardized format. One such format that has gained wide acceptance is the Common Isochronous Protocol (CIP). The data field may contain a header and audio-visual content data, as when the CIP Transport Protocol is used. This header within the data field is the CIP header. For CIP transport, some data fields contain only the CIP header. This use of a header and data protocol within the data field is referred to as an Isochronous Transport Protocol. A receiver of such isochronous packets cannot necessarily predict when a packet will not include a content data portion until after the IEEE 1394-2000 header information is received.

The AV/C Digital Interface Command Set is a command set used for transactions between consumer audio/video equipment over an IEEE 1394-2000 serial bus. This AV/C command set makes use of the Function Control Protocol (FCP) defined by IEC-61883, the ratified international standard for the transport of audio/video command requests and responses. Neither the IEEE 1394-2000 serial bus nor the AV/C Command Set provide a master-slave relationship between the devices coupled within the IEEE 1394-2000 serial bus network. Instead, both the IEEE 1394-2000 serial bus and the AV/C Command Set operate based on the cooperative peer-to-peer coexistence of devices within the network.

IEC-61883 is a ratified international standard for the transport of audio/video command requests and responses. This standard uses the concept of plugs and plug control registers to manage and control the attributes of isochronous data flows. It should be noted that plugs do not physically exist on an audio/video device, but a plug is used to establish an analogy with existing audio/video devices where each flow of information is routed through a physical plug.

An isochronous data flow is sent from one transmitting device to one or more receiving devices by transmitting isochronous packets on an isochronous channel of the IEEE 1394-2000 serial bus. Each isochronous data flow is transmitted to an isochronous channel through one output plug on the transmitting device and is received from that isochronous channel through one input plug on the receiving device.

The transmission of an isochronous data flow through an output plug is reflected by data in an output plug control register (oPCR) and an output master plug register (oMPR) located on the transmitting device. The output master plug register contains all attributes that are common to all isochronous data flows transmitted by the corresponding transmitting device. The output plug control register contains all attributes of the corresponding isochronous data flow that are independent from attributes of other isochronous data flows transmitted by the transmitting device.

The reception of an isochronous data flow through an input plug is reflected by an input plug control register (iPCR) and an input master plug register (iMPR) located on the receiving device. The input master plug register contains all attributes that are common to all isochronous data flows received by the receiving device. The input plug control register contains all attributes of the corresponding isochronous data flow that are independent from attributes of other isochronous data flows received by the receiving device.

An isochronous data flow can be controlled by any device connected to the IEEE 1394-2000 bus by modifying the corresponding plug control registers and by initiating or connecting to an existing transmission. Plug control registers can be modified through asynchronous transactions on the IEEE 1394-2000 bus or by internal modifications if the plug control registers are located on the controlling device.

To transport isochronous data between two audio/video devices on the IEEE 1394-2000 bus, it is necessary for an application to virtually connect an output plug on the transmitting device to an input plug on the receiving device using an isochronous channel. The relationship between one input plug, one output plug and one isochronous channel is called a point-to-point connection. A point-to-point connection can only be broken by the application that established it. An application can also just start the transmission or reception of an isochronous data flow on its own device by connecting one of its output or input plugs respectively to an isochronous channel. The relationship between one output plug and one isochronous channel is called a broadcast-out connection. The relationship between one input plug and one isochronous channel is called a broadcast-in connection. Broadcast-out and broadcast-in connections are collectively called broadcast connections. A broadcast connection can be established only by the device on which the plug is located, but it can be broken by any device.

5C Digital Transmission Content Protection (DTCP) defines a cryptographic protocol for protecting audio/video (A/V) content from unauthorized copying, intercepting, and tampering as it traverses digital transmission mechanisms such as a high-performance serial bus that conforms to the IEEE 1394-2000 standard. Only legitimate A/V content delivered to a source device via another approved copy protection system, such as the DVD Content Scrambling System, will be protected by this copy protection system. A Digital Transmission Licensing Administrator (DTLA) is responsible for establishing and administering the content protection system described in the 5C DTCP specification. According to the 5C DTCP DTLA licensing rules, encrypted audio/video digital content cannot be transmitted using asynchronous block data transfers. However, isochronous packets do adhere to 5C DTCP DTLA licensing rules for transmitting and receiving encrypted audio/video digital content.

Most conventional systems transmit content in non real-time using asynchronous data packets. However, transmission of asynchronous data packets can not enforce 5C copy protection of the data being transmitted. In order to enforce 5C copy protection, isochronous data packets must be used. However, isochronous data packets are conventionally transmitted in real-time.

SUMMARY OF THE INVENTION

The present invention overcomes the limitation of having to transmit isochronous data packets in real-time. A data transmission method of the present invention provides for any speed dubbing of isochronous data packets. The data transmission method configures a source plug on a source device and a destination plug on a destination device for respectively transmitting and receiving isochronous data packets in non real-time. A data stream is then packetized into isochronous data packets configured for non real-time transmission, thereby forming a stream of non real-time isochronous data packets. Preferably, each non real-time isochronous data packet is formed by first packetizing the data stream into conventional real-time isochronous data packets, each real-time isochronous data packet including a real-time header and data payload. Then, either a partial real-time isochronous data packet or multiple real-time isochronous data packets are encapsulated within a data payload portion of a non real-time isochronous data packet. The non real-time isochronous data packet includes a non real-time header in addition to the data payload portion. Preferably, the non real-time header includes an isochronous header that indicates the data length of the data payload portion of the non real-time isochronous data packet, and a CIP header that indicates a non real-time format. Whether partial or multiple real-time isochronous data packets are encapsulated depends on the transmission speed of the non real-time isochronous data packet transfer. If the transmission speed is less than real-time, then a partial real-time isochronous data packet is encapsulated within the non real-time isochronous data packet. The partial real-time isochronous data packet includes the original real-time header and a portion of the original data payload. A remaining portion of the original data payload is packetized in one or more additional real-time isochronous data packets, the header of each additional real-time isochronous data packet is a copy of the original real-time header, and each additional real-time isochronous data packet is encapsulated within a subsequent non real-time isochronous data packet.

If the transmission speed is greater than real-time, then multiple real-time isochronous data packets are encapsulated within a single non real-time isochronous data packet. For example, if the transmission speed is three times that of real-time, then three real-time isochronous data packets are encapsulated within each non real-time isochronous data packet.

The stream of non real-time isochronous data packets is transmitted from the source device via the source plug to the destination device via the destination plug. Once received, the CIP header is read and it is determined that the received isochronous data packets are formatted for non real-time transfer. The non real-time header is stripped off and it is determined if a partial real-time isochronous data packet or multiple real-time isochronous data packets are encapsulated within the data payload portion of the non real-time isochronous data packet. If multiple real-time isochronous data packets are included, then each real-time isochronous data packet is conventionally processed. If a partial real-time isochronous data packet is included, then the partial packet is held while subsequent non real-time isochronous data packets including the remaining portion of the original data payload are received by the destination device. Once the entire original data payload is received, the original real-time isochronous data packet is processed.

In one aspect of the present invention, a method of any speed dubbing using isochronous data packets includes configuring a transmitting plug on a transmitting device for transmitting isochronous data packets in non real-time, configuring a receiving plug on a receiving device for receiving the isochronous data packets received in non real-time, packetizing a data stream into the isochronous data packets configured for non real-time transmission, thereby forming a stream of non real-time isochronous data packets, and transmitting the non real-time isochronous data packets from the transmitting device via the transmitting plug to the receiving device via the receiving plug. The stream of non real-time isochronous data packets is formed by packetizing the data stream into real-time isochronous data packets and encapsulating one or more real-time isochronous data packets within a non real-time header to form each non real-time isochronous data packet within the stream of non real-time isochronous data packets, further wherein the number of real-time isochronous data packets encapsulated within each non real-time isochronous data packet is associated with a non real-time transmission speed of the stream of non real-time isochronous data packets. If the non real-time transmission speed is greater than real-time, then the non-real time transmission speed is a multiple of the real-time transmission speed and the number of real-time isochronous data packets encapsulated within each non real-time isochronous data packet corresponds to the multiple. If the non real-time transmission speed is less than real-time then a single real-time isochronous data packet is encapsulated within each non real-time isochronous data packet such that only a portion of the data originally contained within the single real-time isochronous data packet is included within the encapsulated non real-time isochronous data packet, and a remaining portion of the data originally contained within the single real-time isochronous data packet is encapsulated in one or more subsequent non real-time isochronous data packets. The non real-time header includes a non real-time isochronous header and a non real-time CIP header. The non real-time isochronous header includes a data length field for indicating the amount of data contained within the non real-time isochronous data packet. The non real-time CIP header includes a format field for indicating that the non real-time isochronous data packet is formatted for non real-time data transfer. The data stream includes audio/visual content data. In some embodiments, the non real-time isochronous data packets are transmitted in non real-time over an isochronous channel. In some embodiments, the non real-time isochronous data packets are transmitted in non real-time over an asynchronous stream.

In another aspect of the present invention, a method of transmitting isochronous data packets in non real-time includes configuring a source plug of a source device for transmitting isochronous data packets in non real-time, packetizing a data stream into real-time isochronous data packets, determining a transmission speed of the isochronous data packets to be transmitted, encapsulating a selective one of a partial real-time isochronous data packet and multiple real-time isochronous data packets within a non real-time isochronous data packet, wherein a number of encapsulated real-time isochronous data packets is based on the transmission speed, and transmitting the non real-time isochronous data packets via the source plug. If the transmission speed is greater than real-time, then multiple real-time isochronous data packets are encapsulated within the non real-time isochronous data packet. If the transmission speed is less than real-time, then a partial real-time isochronous data packet is encapsulated within the non real-time isochronous data packet and a remaining portion of the real-time isochronous data packet is encapsulated in one or more subsequent non real-time isochronous data packets. Each non real-time isochronous data packet includes a non real-time isochronous header and a non real-time CIP header. The non real-time isochronous header includes a data length field for indicating the amount of data contained within the non real-time isochronous data packet. The non real-time CIP header includes a format field for indicating that the non real-time isochronous data packet is formatted for non real-time data transfer. The data stream includes audio/visual content data. In some embodiments, the non real-time isochronous data packets are transmitted in non real-time over an isochronous channel. In some embodiments, the non real-time isochronous data packets are transmitted in non real-time over an asynchronous stream.

In yet another aspect of the present invention, a method of receiving isochronous data packets in non real-time including configuring a destination plug of a destination device for receiving isochronous data packets in non real-time, receiving isochronous data packets over the destination plug, determining a format of the received isochronous data packets, if the format indicates that the received isochronous data packets are non real-time isochronous data packets, then determining a transmission speed of the non real-time isochronous data packets, isolating a selective one of a partial real-time isochronous data packet and multiple real-time isochronous data packets encapsulated within the non real-time isochronous data packet, wherein a number of real-time isochronous data packets is based upon the transmission speed, and processing the real-time isochronous data packets. If a partial real-time isochronous data packet is encapsulated within the non real-time isochronous data packet, then a remaining portion of the real-time isochronous data packet is encapsulated in one or more subsequent non real-time isochronous data packets, and the remaining portion is collected and aggregated with the partial real-time isochronous data packet before processing. Each non real-time isochronous data packet includes a non real-time isochronous header and a non real-time CIP header. The non real-time isochronous header includes a data length field for indicating the amount of data contained within the non real-time isochronous data packet. The non real-time CIP header includes a format field for indicating that the non real-time isochronous data packet is formatted for non real-time data transfer. The data stream includes audio/visual content data.

In still yet another aspect of the present invention, a method of configuring a plug to support non real-time streams of isochronous data packets including embedding a non real-time plug transfer information block within a plug configuration information block, defining a non real-time information type within the non real-time plug transfer information block, wherein the non real-time information type indicates a non real-time stream of isochronous data packets, setting a bandwidth value within the non real-time plug transfer information block corresponding to a bus bandwidth of the non real-time stream of isochronous data packets, and setting an enable field within the non real-time plug transfer information block to enable the plug to support non real-time streams of isochronous data packets.

In other aspect of the present invention, an apparatus for communicating isochronous data packets in non real-time includes a configuring circuit to configure a plug to communicate isochronous data packets in non real-time, a packetizing circuit to packetize a data stream into isochronous data packets configured for non real-time transmission, thereby forming a stream of non real-time isochronous data packets, a transceiver circuit configured to communicate isochronous data packets in non real-time via the plug, a de-packetizing circuit to extract one or more real-time isochronous data packets encapsulated within each non real-time isochronous data packet, and a controller coupled to the configuring circuit, the packetizing circuit, the transceiver circuit, and the de-packetizing circuit, wherein the controller processes the extracted real-time isochronous data packets. The stream of non real-time isochronous data packets is formed by packetizing the data stream into real-time isochronous data packets and encapsulating one or more real-time isochronous data packets within a non real-time header to form each non real-time isochronous data packet within the stream of non real-time isochronous data packets, further wherein the number of real-time isochronous data packets encapsulated within each non real-time isochronous data packet is associated with a non real-time transmission speed of the stream of non real-time isochronous data packets. If the non real-time transmission speed is greater than real-time, then the non-real time transmission speed is a multiple of the real-time transmission speed and the number of real-time isochronous data packets encapsulated within each non real-time isochronous data packet corresponds to the multiple. If the non real-time transmission speed is less than real-time then a single real-time isochronous data packet is encapsulated within each non real-time isochronous data packet such that only a portion of the data originally contained within the single real-time isochronous data packet is included within the encapsulated non real-time isochronous data packet, and a remaining portion of the data originally contained within the single real-time isochronous data packet is encapsulated in one or more subsequent non real-time isochronous data packets. The non real-time header includes a non real-time isochronous header and a non real-time CIP header. The non real-time isochronous header includes a data length field for indicating the amount of data contained within the non real-time isochronous data packet. The non real-time CIP header includes a format field for indicating that the non real-time isochronous data packet is formatted for non real-time data transfer. The data stream includes audio/visual content data. The non real-time isochronous data packets are transmitted in non real-time over an isochronous channel. The non real-time isochronous data packets are transmitted in non real-time over an asynchronous stream. If a partial real-time isochronous data packet is encapsulated within the non real-time isochronous data packet, then a remaining portion of the real-time isochronous data packet is encapsulated in one or more subsequent non real-time isochronous data packets, and the remaining portion is collected and aggregated with the partial real-time isochronous data packet before processing. The transceiver circuit is configured to transmit isochronous data packets in non real-time via the plug. The transceiver circuit is configured to receive isochronous data packets in non real-time via the plug.

DETAILED DESCRIPTION OF THE PREFERRED EMBODIMENT

The present invention overcomes the limitation of having to transmit isochronous data packets in real-time. A data transmission method of the present invention allows the delivery of audio/video (A/V) digital content as isochronous data packets transmitted in non real-time. It is important that the A/V digital content is packetized as isochronous data packets, and not asynchronous data packets, since isochronous data packets adhere to 5C DTCP DTLA rules for transmitting and receiving encrypted A/V digital content. According to 5C DTCP DTLA licensing rules, encrypted A/V digital data cannot be transmitted using asynchronous data packets. Non real-time transmission can be either faster than real-time, such as dubbing digital audio content, or slower then real-time, such as recording A/V content during non peak hours for later viewing but requiring lower bandwidth to transmit the data. Preferably, data transmission is over an IEEE 1394-2000 serial bus. Slower than real-time transfers are preferably performed using isochronous data packets over isochronous channels according to IEEE 1394-2000 isochronous arbitration. Alternatively, slower than real-time transfers are performed using isochronous data packets over asynchronous streams according to IEEE 1394-2000 asynchronous arbitration. Unfortunately, asynchronous transmission does not guarantee available bandwidth as transmission is subject to available time slots within the asynchronous cycle. Therefore, faster than real-time transfers are preferably performed using isochronous data packets over isochronous channels. Faster than real-time transfers preferably utilize reserved bandwidth which is reserved prior to transmission by the Isochronous Resource Manager (IRM). By reserving bandwidth, the speed of transmission is guaranteed.

Figure 1:
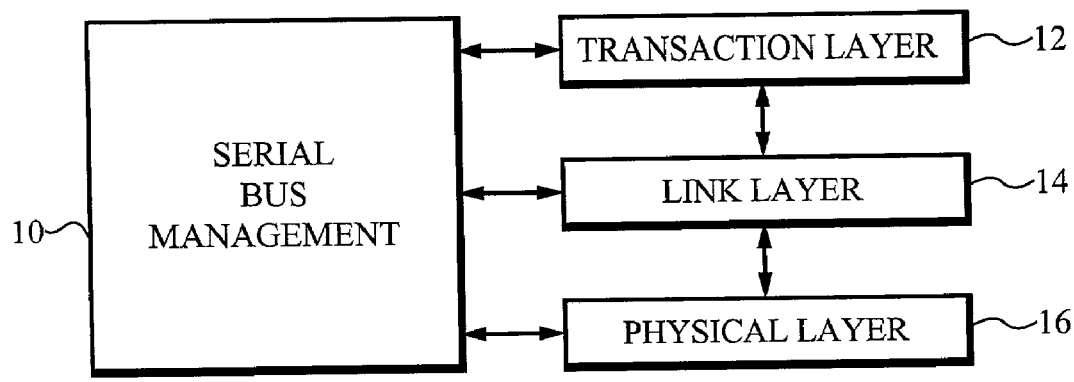
FIG. 1 illustrates a protocol defined by the IEEE 1394-2000 standard.
Figure 2:
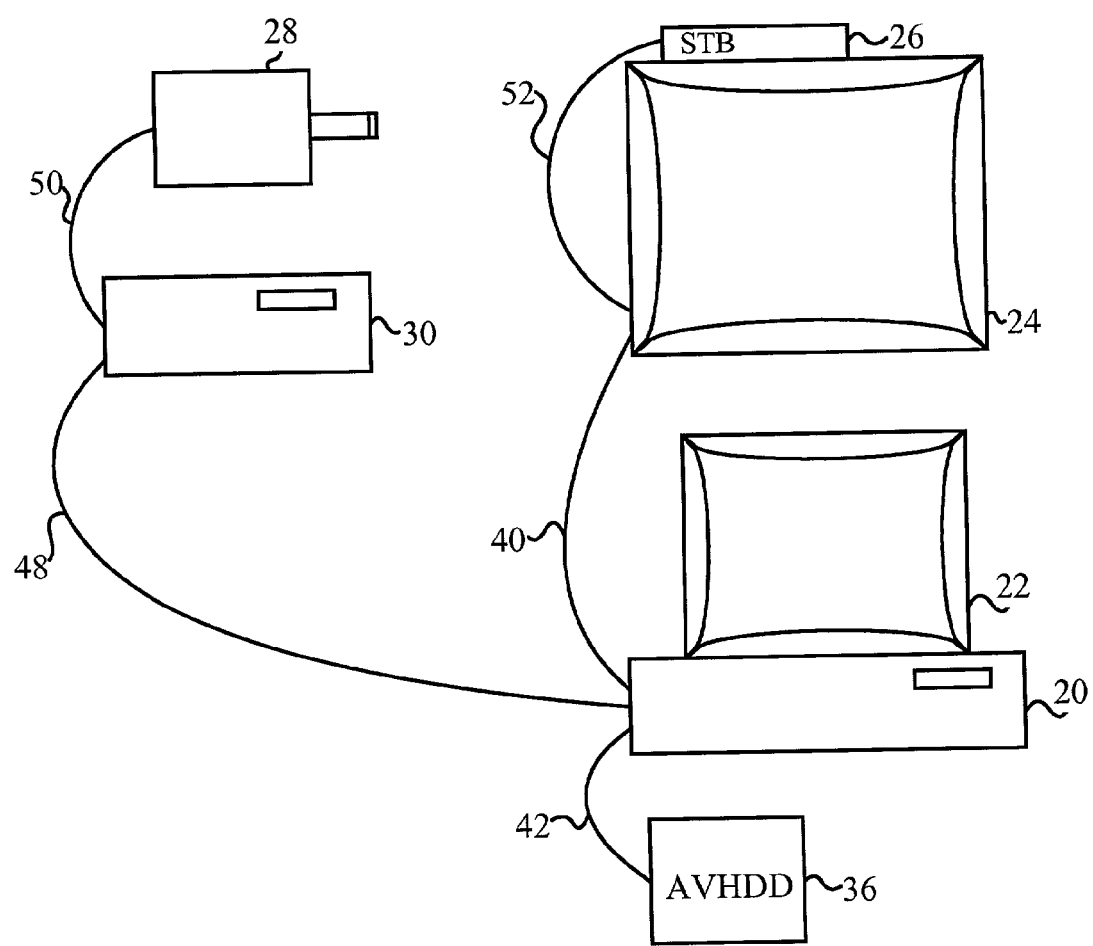
FIG. 2 illustrates an exemplary IEEE 1394-2000 serial bus network of devices including a video camera, a video cassette recorder, a set-top box, a television, a computer and an audio/video hard disk drive.

Preferably, A/V digital data is packetized as isochronous data packets and communicated in non real-time between AV/C compliant devices residing within an IEEE 1394-2000 serial bus network. FIG. 2 illustrates an exemplary network of devices including a video camera 28, a video cassette recorder (VCR) 30, a settop box 26, a television 24, a computer 20 and an audio/video hard disk drive (AVHDD) 36 coupled together by IEEE 1394-2000 cables 40, 42, 48, 50 and 52. The IEEE 1394-2000 cable 50 couples the video camera 28 to the VCR 30, allowing the video camera 28 to send data, commands and parameters to the VCR 30 for recording. The IEEE 1394-2000 cable 48 couples the VCR 30 to the computer 20. The IEEE 1394-2000 cable 42 couples the computer 20 to the AVHDD 36. The IEEE 1394-2000 cable 40 couples the computer 20 to the television 24. The IEEE 1394-2000 cable 52 couples the television 24 to the settop box 26.

The configuration illustrated in FIG. 2 is exemplary only. It should be apparent that an audio/video network could include many different combinations of components. The devices within such an IEEE 1394-2000 network are autonomous devices, meaning that in an IEEE 1394-2000 network, as the one illustrated in FIG. 2, in which a computer is one of the devices, there is not a true "master-slave" relationship between the computer and the other devices. In many IEEE 1394-2000 network configurations, a computer may not be present. Even in such configurations, the devices within the network are fully capable of interacting with each other on a peer basis. It should be recognized that data, commands and parameters can be sent between all of the devices within the IEEE 1394-2000 network, as appropriate.

Figure 3:
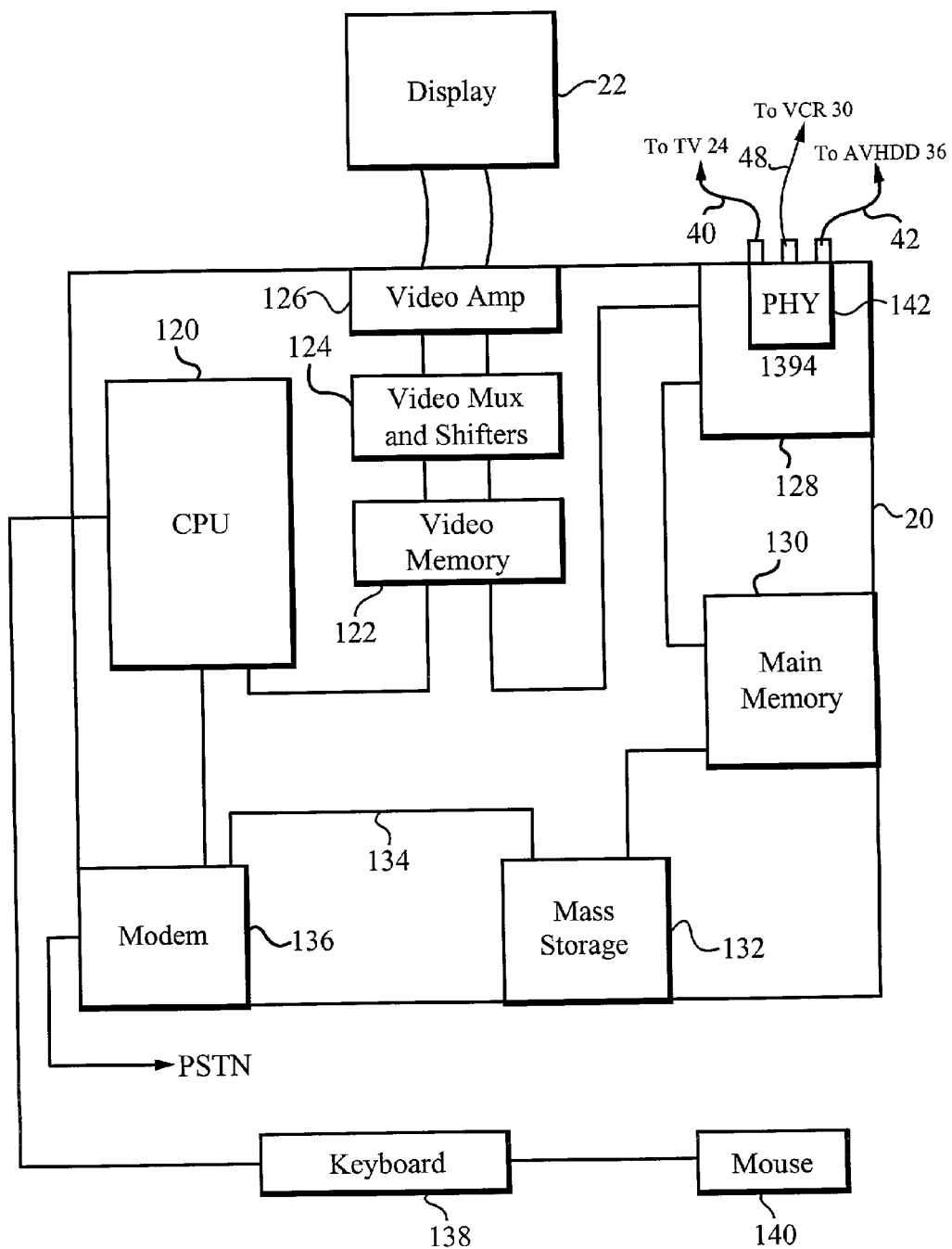
FIG. 3 illustrates an exemplary block diagram of the internal components of the computer 20.

A block diagram of the internal components of the computer system 20 is illustrated in FIG. 3. Within the drawings, the same elements as to FIGS. 1–9 are labeled with the same numbers. The computer system 20 includes a central processor unit (CPU) 120, a main memory 130, a video memory 122, a mass storage device 132, a modem 136, and an IEEE 1394-2000 interface circuit 128, all coupled together by a conventional bidirectional system bus 134. The modem 136 is preferably coupled to the public switched telephone network (PSTN) for sending and receiving communications. The interface circuit 128 includes the physical interface circuit 142 for sending and receiving communications on the IEEE 1394-2000 serial bus network. The physical interface circuit 142 is coupled to the television 24, to the VCR 30, and to the AVHDD 36 over the IEEE 1394-2000 serial bus cables 40, 48, and 42, respectively. In the preferred embodiment of the present invention, the interface circuit 128 is implemented on an IEEE 1394-2000 interface card within the computer system 20. However, it should be apparent to those skilled in the art that the interface circuit 128 can be implemented within the computer system 20 in any other appropriate manner, including building the interface circuit onto the motherboard itself. The mass storage device 132 may include both fixed and removable media using any one or more of magnetic, optical or magneto-optical storage technology or any other available mass storage technology. The system bus 134 contains an address bus for addressing any portion of the memory 122 and 130. The system bus 134 also includes a data bus for transferring data between and among the CPU 120, the main memory 130, the video memory 122, the mass storage device 132, the modem 136, and the interface circuit 128.

The computer system 20 is also coupled to a number of peripheral input and output devices including the keyboard 138, the mouse 140 and the associated display 22. The keyboard 138 is coupled to the CPU 120 for allowing a user to input data and control commands into the computer system 20. A conventional mouse 140 is coupled to the keyboard 138 for manipulating graphic images on the display 22 as a cursor control device. As discussed above, a user can utilize the computer system 20 to initiate a transaction with a content provider.

A port of the video memory 122 is coupled to a video multiplex and shifter circuit 124, which in turn is coupled to a video amplifier 126. The video amplifier 126 drives the display 22. The video multiplex and shifter circuitry 124 and the video amplifier 126 convert pixel data stored in the video memory 122 to raster signals suitable for use by the display 22.

Two problems exist in transmitting isochronous data packets in non real-time. The first problem is configuring an AV/C source plug and an AV/C destination plug to support non real-time streams. The second problem is packetizing the A/V digital content for transmission in non real-time. The data transmission method of the present invention preferably works within the context of the AV/C and IEC 61883 Standards to provide solutions to these two problems.

Within the framework of existing AV/C standards, information blocks are used to provide information to the AV/C devices. Information blocks are data structures. The information blocks are created in real-time during execution within the local memory. Specifically, there is provided within the AV/C standard a plug configuration information block for configuring an AV/C device plug for real-time transmission of isochronous data packets over an isochronous channel. The code for this existing plug configuration information block is 88 07$_{16}$. For communications between a host controller AV/C device and a target AV/C device, information blocks are the mechanism by which information is conveyed between the two. The longevity of each information block typically corresponds to how long the plug is active within the context of the current plug configuration information block. Embedded within the plug configuration information block are other information blocks including an information block that provides the type of data that is to be transmitted over the plug, for example Digital Video (DV), MPEG, or Audio type data. The AV/C standards discourage modifying existing information blocks. If additional information is to be provided, the AV/C standard provides means for adding new information blocks by which the additional information is to be provided.

The data transmission method of the preferred embodiment of the present invention creates a new information block embedded within the plug configuration information block (88 07$_{16}$). This new information block defines the non real-time properties to configure the plug for non real-time A/V digital content transmission/reception. The new information block includes an enable field for non real-time stream transfer and information on bus bandwidth, which is related to the non real-time transfer speed, to be used for the transfer. This new embedded information block fits within the guidelines of the AV/C working group for adding device subunit enhancements. The absence of this new information block within the plug configuration information block indicates real-time A/V content transmission/reception.

Figure 4:
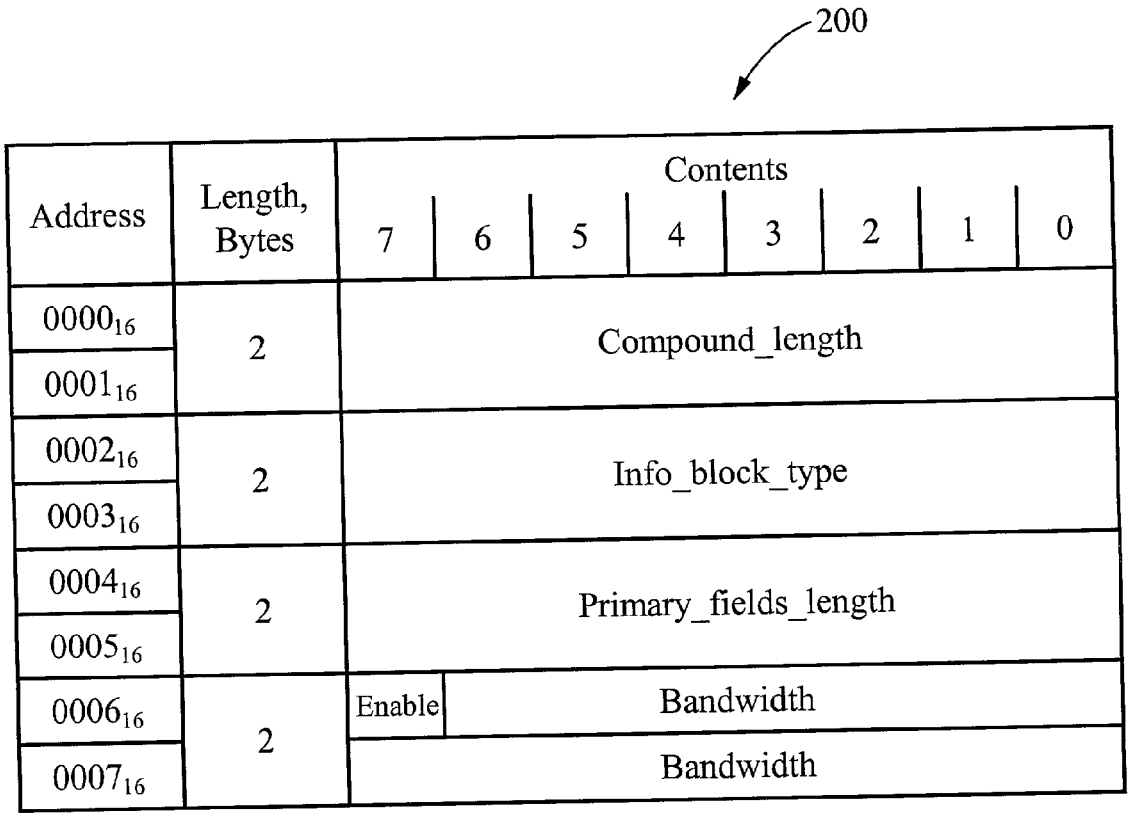
FIG. 4 illustrates a non real-time plug transfer information block according to the preferred embodiment of the present invention.

The new information block embedded within the existing plug configuration information block is referred to as a non real-time plug transfer information block. The non real-time plug transfer information block is illustrated in FIG. 4. A non real-time plug transfer information block 200 includes a compound_length field, an info_block_type field, a primary_fields_length field, an enable field, and a bandwidth field. The bit format of each field is determined by the AV/C standard. The compound_length field specifies the number of bytes for the remainder of the non real-time plug transfer information block 200, which is all fields that follow the compound_length field. The info_block_type field is set to a code indicating that the non real-time plug transfer information block 200 describes the plug's non real-time parameters. The primary_fields_length field specifies the number of bytes for the remaining non real-time plug transfer information block 200, through address 0007$_{16}$ in this case. For the non real-time plug transfer information block 200 illustrated in FIG. 4, the primary_fields_length field is two. The enable field is set to indicate whether or not the plug is configured for non real-time A/V content transmission/reception. The enable field, when clear, indicates that the plug is configured for real-time A/V content transmission/reception. The bandwidth field indicates the nominal rate of the data stream transfer. The value in the bandwidth field is defined in terms of reserved bandwidth on the IEEE 1394-2000 serial bus as reserved by the Isochronous Resource Manager. Logically, the value of the bandwidth field defines the speed of the data transmission. For example, one-half real-time speed, two times real-time speed, three times real-time speed, etc.

Proper plug configuration using the non real-time plug transfer information block is necessary to prepare the transmitting and receiving AV/C devices for non real-time data transfer. Next, the A/V stream content is configured for transmission in non real-time.

Figure 5:
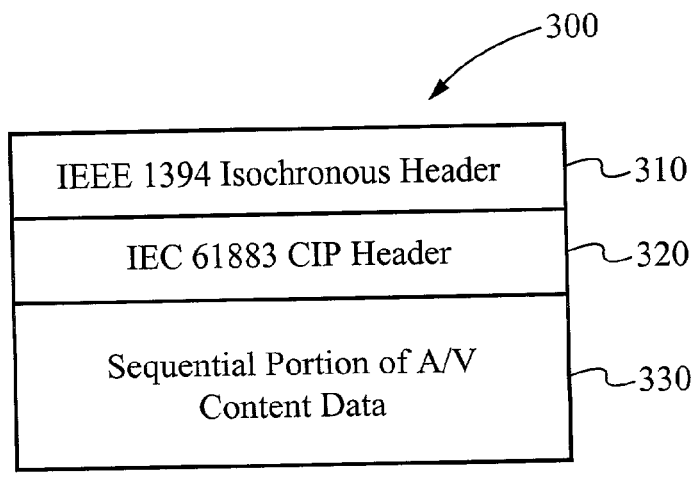
FIG. 5 illustrates an IEEE 1394-2000 isochronous data packet.

At a transmitting device, the data transmission method of the present invention first prepares the A/V stream content as if it is to be transmitted in real-time. The AV/C stream content is prepared for real-time transmission according to conventional methodology. A 1394-2000 isochronous data packet is characterized by a header portion and a data portion. The header portion is created by first adding an IEEE 1394-2000 isochronous header according to the IEEE 1394-2000 standard. Second, an IEC 61883 CIP header according to the IEC 61883 standard is added to the header portion. The data portion is created by parsing the A/V stream content in sequential portions and adding a portion into the data portion according to IEC 61883 standards. As a result, IEEE 1394-2000 isochronous data packets are created for sequential portions of the A/V stream content. FIG. 5 illustrates an IEEE 1394-2000 isochronous data packet 300 formatted for real-time transmission. The header portion of the isochronous packet 300 includes an IEEE 1394-2000 isochronous header 310 and an IEC 61883 CIP header 320. The data portion includes a sequential portion of the A/V content data 330.

The isochronous header 310 includes a data_length field which is set to a value that conforms to the bandwidth allocated in the output plug configuration information block. The data_length field indicates the amount of data included in the IEEE 1394-2000 isochronous data packet. The CIP header 320 includes a fmt field which is set to a value that indicates the format of the portion of A/V stream content in the data portion of the isochronous packet 300. The value in the fmt field of a real-time IEEE 1394-2000 isochronous data packet indicates the format is in real-time.

According to the data transmission method of the present invention, the real-time IEEE 1394-2000 isochronous data packet(s) are then encapsulated within an isochronous header and CIP header identified for non real-time A/V content, thereby forming a non real-time packet. In other words, the data transmission method encapsulates, or re-wraps, existing packetized real-time A/V content by adding another IEEE 1394-2000 isochronous header and IEC 61883 CIP header. In the added isochronous header, the data_length field defines the size of the re-wrapped, non real-time packet. In the added CIP header, the fmt field indicates non real-time A/V content. The number of real-time IEEE 1394-2000 isochronous data packets which are encapsulated within each non real-time packet is determined by the speed of the non real-time transmission. For example, if the non real-time transmission is twice the real-time speed, two real-time IEEE 1394-2000 isochronous data packets are encapsulated within the non real-time packet.

Figure 6:
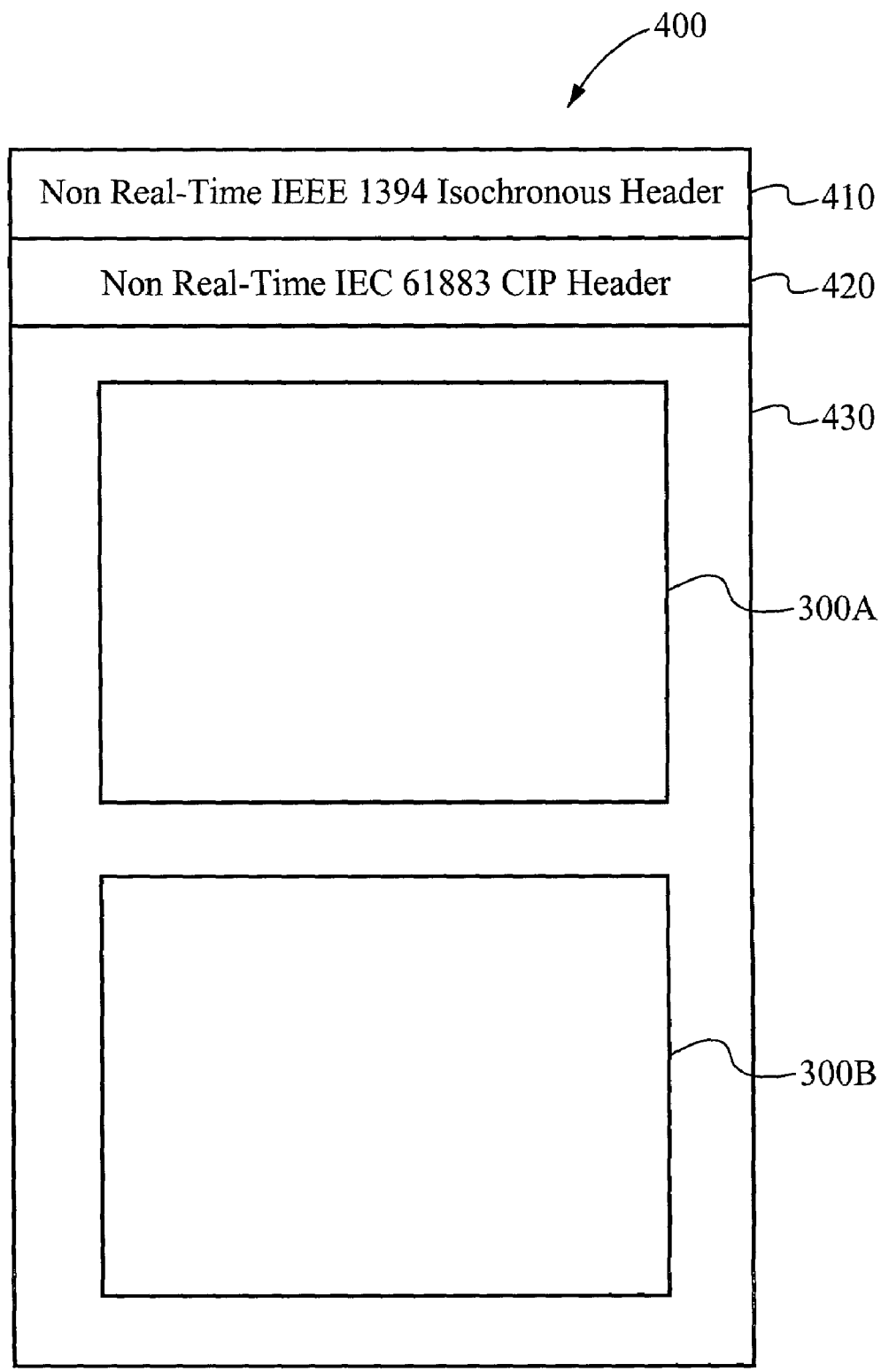
FIG. 6 illustrates an exemplary non real-time 1394-2000 isochronous data packet transmitted at twice the real-time transmission speed.

FIG. 6 illustrates a non real-time IEEE 1394-2000 isochronous data packet transmitted at twice the real-time transmission speed. A non real-time IEEE 1394-2000 isochronous data packet 400 includes a non real-time IEEE 1394-2000 isochronous header 410, a non real-time IEC 61883 CIP header 420, and an encapsulated data portion 430. The encapsulated data portion 430 includes two real-time IEEE 1394-2000 isochronous data packets 300A and 300B. The real-time data packets 300A and 300B are each formatted the same as IEEE 1394-2000 isochronous data packet 300 and each represent sequential portions of the A/V stream content. The fmt field in each of the CIP headers of the real-time data packets 300A and 300B is set to a value indicating real-time transmission. However, the fmt field in the CIP header 420 is set to a value indicating non real-time transmission. The data_length field in each of the isochronous headers of the real-time data packets 300A and 300B is set to a value corresponding to the bandwidth necessary for real-time transmission. The value of the data_length field of the non real-time isochronous header 410 corresponds to the allocated bandwidth for the non real-time transmission. The data_length field of the non real-time isochronous header 410 is equal to the sum of the size of each of the real-time data packets 300A and 300B including both of their isochronous headers, CIP headers, and encapsulated data. Instead of a single real-time isochronous data packet being transmitted each cycle, a non real-time isochronous data packet containing two real-time isochronous data packets is transmitted each cycle.

Figure 7:
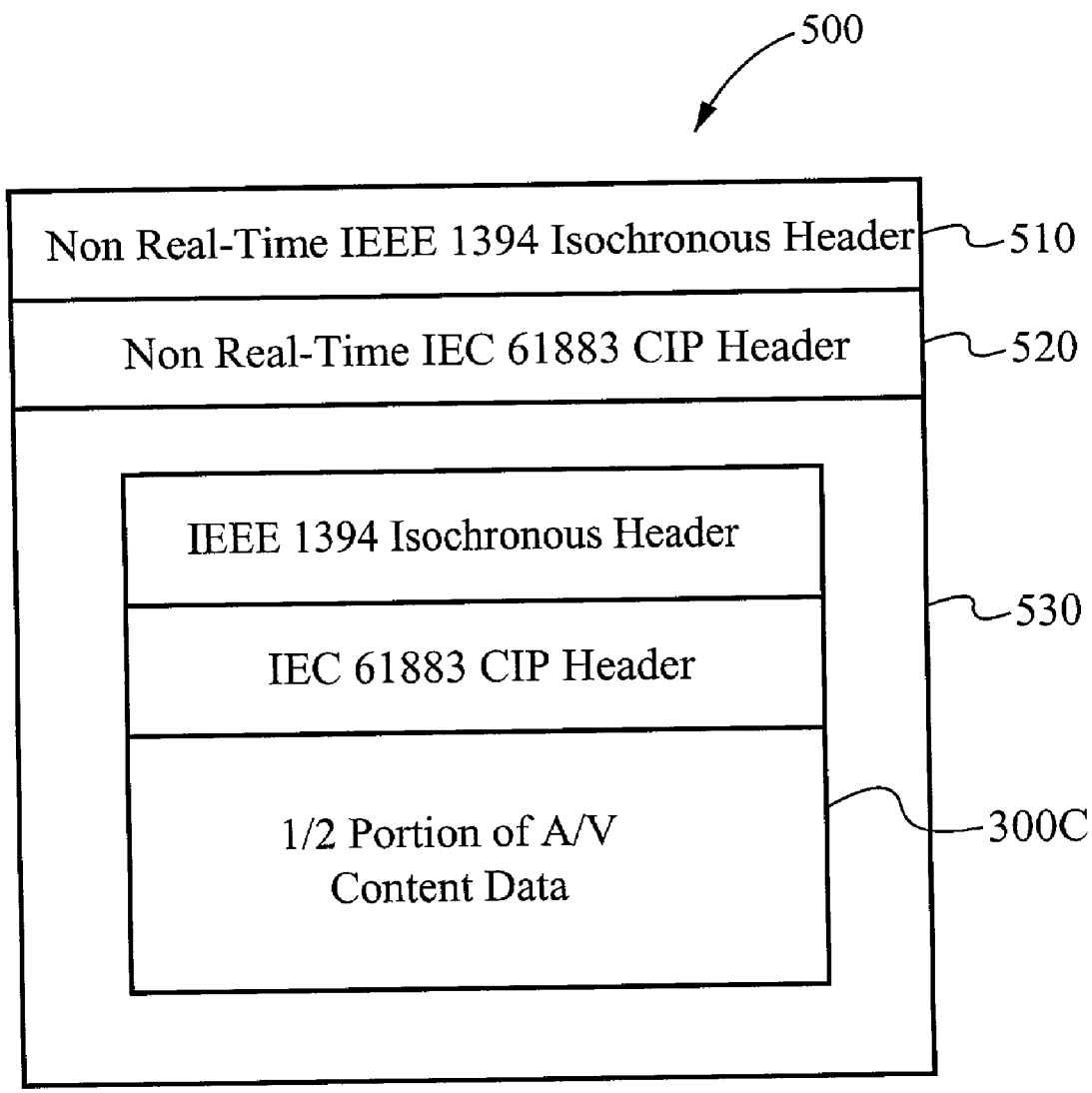
FIG. 7 illustrates an exemplary non real-time 1394-2000 isochronous data packet transmitted at one-half the real-time transmission speed.

FIG. 7 illustrates a non real-time IEEE 1394-2000 isochronous data packet transmitted at one-half the real-time transmission speed. A non real-time IEEE 1394-2000 isochronous data packet 500 includes a non real-time IEEE 1394-2000 isochronous header 510, a non real-time IEC 61883 CIP header 520, and an encapsulated data portion 530. The encapsulated data portion 530 includes one real-time IEEE 1394-2000 isochronous data packet 300C. The real-time IEEE 1394-2000 isochronous data packet 300C is formatted the same as IEEE 1394-2000 isochronous data packet 300, however the data portion contains only one-half the data of the real-time IEEE 1394-2000 isochronous data packet 300. A controller on a transmitting device divides the data portion of the real-time IEEE 1394-2000 isochronous data packet 300 in half. Preferably, the controller counts quadlets within the data portion and divides the total number of quadlets in two. The isochronous header and the CIP header of the real-time data packet 300C remain unchanged from the real-time isochronous data packet 300. The fmt field in the CIP header of the real-time data packet 300C indicates real-time format. However, the fmt field in the non real-time CIP header 520 indicates non real-time format. The data_length of the real-time isochronous data packet 300C indicates the amount of data corresponding to the bandwidth necessary for real-time transmission. Since the data portion of the real-time data packet 300C only contains half the amount of data as the original real-time IEEE 1394-2000 isochronous data packet 300C and the isochronous header of the real-time data packet 300C is unchanged, the data_length in the isochronous header of the real-time data packet 300C is twice as large as the actual data contained in the data portion of the real-time data packet 300C. The data_length field of the non real-time IEEE 1394-2000 isochronous header 510 is the amount of data included in the encapsulated data 530 of the non real-time IEEE 1394-2000 isochronous data packet 500. Therefore, the data_length field of the non real-time IEEE 1394-2000 isochronous header 510 is one-half the value of the data_length field in the real-time data packet 300C. Instead of a single real-time isochronous data packet being transmitted every cycle, a non real-time IEEE 1394-2000 isochronous data packet containing essentially one-half of a real-time isochronous data packet is transmitted each cycle.

At a receiving device, the non real-time IEEE 1394-2000 isochronous data packets are received and the non real-time isochronous and CIP headers are stripped off, thereby exposing the real-time IEEE 1394-2000 isochronous data packets containing the packetized A/V content stream. The fmt field in the non real-time CIP header is read to determine that the received packet is in a non real-time format. The non real-time format indicates to the receiving device that the data portion of the received non real-time isochronous data packet includes real-time isochronous data packets. The non real-time format also signals the receiving device to search the data portion and read the header of a real-time isochronous data packet included within the data portion. The data_length field of each real-time isochronous header is read to determine the size of each real-time packet. The data_length field of the non real-time isochronous header is read to determine the size of the data portion of the received non real-time packet. The data_length of the non real-time data packet is compared to the data_length of the real-time data packet. If the non real-time data packet is delivered at a speed greater than real-time, the data_length of the non real-time data packet is greater than the data_length of the real-time packet. For a speed greater than real-time, there are multiple real-time data packets included in the data portion of the non real-time data packet. Conventional real-time isochronous data packet processing is used to convert the multiple real-time IEEE 1394-2000 isochronous data packets to the A/V content stream, which is then transferred to storage.

In the case where the non real-time transmission speed is two times the rate of the real-time transmission speed, a stream of data packets similar to the non real-time isochronous data packet 400 are received by the receiving device. The receiving device strips off the non real-time isochronous header 410 and the non real-time CIP header 420. The fmt field in the non real-time CIP header 420 is read to determine that the received non real-time isochronous data packet 400 is in a non real-time format. This indicates to the receiving device that the encapsulated data 430 includes real-time data packets. To determine if a partial real-time data packet or multiple real-time data packets are included in the encapsulated data 430, the data_length field of the non real-time isochronous header 410 is read, and the real-time isochronous header of the real-time data packet 300A is searched for in the encapsulated data 430. Once the real-time isochronous header is located, the data_length of the real-time isochronous data packet 300A is read. The data_length of the non real-time isochronous data packets 400 is compared to the data_length of the real-time isochronous data packet 300A. It is determined that the data_length of the non real-time isochronous data packets 400 is greater than and approximately twice the size of the data_length of the real-time isochronous data packet 300A. This comparison indicates to the receiving device that there are multiple real-time data packets included in the encapsulated data 430. The multiple real-time data packets, in this case real-time isochronous data packets 300A and 300B, are then processed as conventional real-time IEEE 1394-2000 isochronous data packets.

If the non real-time packet is delivered at a speed less than real-time, the data_length of the non real-time data packet is less than the data_length of the real-time packet. For a speed less than real-time, there is a single real-time packet included in the data portion of the non real-time data packet where the single real-time packet includes a portion of the data of an originally packetized real-time IEEE 1394-2000 isochronous data packet. In this case, the receiving device expects to receive the remaining portion of the originally packetized real-time IEEE 1394-2000 isochronous data packet in subsequent cycles. The real-time data packet is not processed until data corresponding to a complete originally packetized real-time IEEE 1394-2000 isochronous data packet is received. Receiving the complete real-time data packet can take two or more cycles depending on the non real-time speed. Once a complete real-time IEEE 1394-2000 isochronous data packet is received, conventional real-time isochronous data packet processing is used to convert the multiple real-time IEEE 1394-2000 isochronous data packets to the A/V content stream, which is then transferred to storage.

In the case where the non real-time transmission speed is one-half the rate of the real-time transmission speed, a stream of data packets similar to the non real-time isochronous data packet 500 are received by the receiving device. The receiving device strips off the non real-time isochronous header 510 and the non real-time CIP header 520. The fmt field in the non real-time CIP header 520 is read to determine that the received non real-time isochronous data packet 500 is in a non real-time format. This indicates to the receiving device that the encapsulated data 530 includes real-time data packets. To determine if a partial real-time data packet or multiple real-time data packets are included in the encapsulated data 530, the data_length field of the non real-time isochronous header 510 is read, and the real-time isochronous header of the real-time data packet 300C is searched for in the encapsulated data 530. Once the real-time isochronous header is located, the data_length of the real-time isochronous data packet 300C is read. The data_length of the non real-time isochronous data packets 500 is compared to the data_length of the real-time isochronous data packet 300C. It is determined that the data_length of the non real-time isochronous data packets 500 is less than and approximately one-half the size of the data_length of the real-time isochronous data packet 300C. This comparison indicates to the receiving device that there is a single real-time data packet included in the encapsulated data 430 and that the real-time packet includes only half the necessary data. Since only half of the necessary data is available, the receiving device does not process the real-time isochronous data packet 300C until the next cycle when the other half of the necessary data is received. Once the other half of the necessary data is received, it is added to the real-time isochronous data packet 300C. The real-time isochronous data packet 300C is then processed as a conventional real-time IEEE 1394-2000 isochronous data packet.

Figure 8:
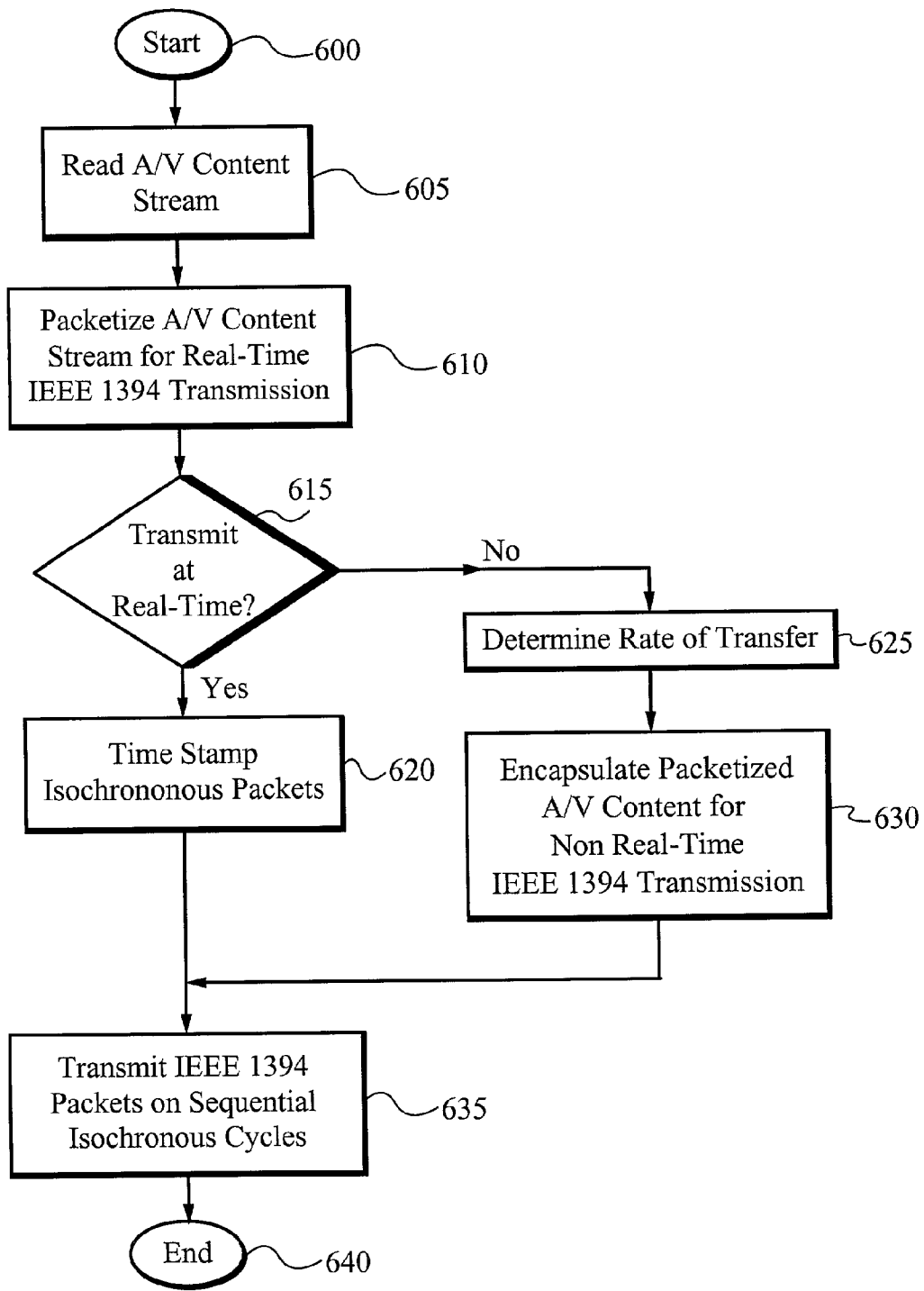
FIG. 8 illustrates a flowchart showing the preferred process of transmitting A/V content in non real-time using isochronous data packets.

FIG. 8 illustrates a flowchart showing the preferred process of transmitting A/V content in non real-time using isochronous data packets. The transmitting process begins at the step 600. At the step 605, the A/V content stream to be transmitted is read from storage. At the step 610, the A/V content stream is packetized into IEEE 1394-2000 isochronous data packets for real-time transmission. At the step 615, it is determined if the transmission is to be in real-time. To make this determination, the info_block_type field in the plug configuration information block is read. If it is determined at the step 615 that the transmission is to be in real-time, then at the step 620 each isochronous data packet is time stamped according to conventional IEEE 1394-2000 real-time isochronous data protocols. If it is determined at the step 615 that the transmission is not to be in real-time, then at the step 625 the rate of transfer is determined. The rate of transfer is determined by reading the bandwidth field in the plug configuration information block and determining the corresponding transfer rate. Bandwidth for transmission on the IEEE 1394-2000 serial bus is allocated by the Isochronous Resource Manager. At the step 630, the real-time IEEE 1394-2000 isochronous data packets are encapsulated for non real-time IEEE 1394-2000 transmission. If the non real-time rate of transfer is greater than real-time, then multiple real-time IEEE 1394-2000 isochronous data packets are encapsulated by a non real-time CIP header and a non real-time isochronous header to form a non real-time IEEE 1394-2000 isochronous data packet. The format of the non real-time headers are comparable in format to their real-time counterparts. However, the non real-time isochronous header includes a data_length field corresponding to the size of the encapsulated real-time IEEE 1394-2000 isochronous data packet, and the non real-time CIP header includes a fmt field indicating a non real-time format.

If the non real-time rate of transfer is less than real-time, then a single real-time IEEE 1394-2000 isochronous data packet is encapsulated by the non real-time CIP header and the non real-time isochronous header. Only a portion of the data within the data portion of the single real-time IEEE 1394-2000 isochronous data packet is included within the encapsulated single real-time IEEE 1394-2000 isochronous data packet. The exact amount of data is determined by the rate of transfer. The remaining portion of the data is encapsulated in one or more subsequent non real-time IEEE 1394-2000 isochronous data packets.

After the real-time IEEE 1394-2000 isochronous data packets are encapsulated for non real-time IEEE 1394-2000 transmission at the step 630, or after each isochronous data packet is time stamped according to conventional IEEE 1394-2000 real-time isochronous data protocols at the step 620, the IEEE 1394-2000 isochronous data packets are transmitted on sequential isochronous cycles at the step 635. The transmitting process ends at the step 640.

Figure 9:
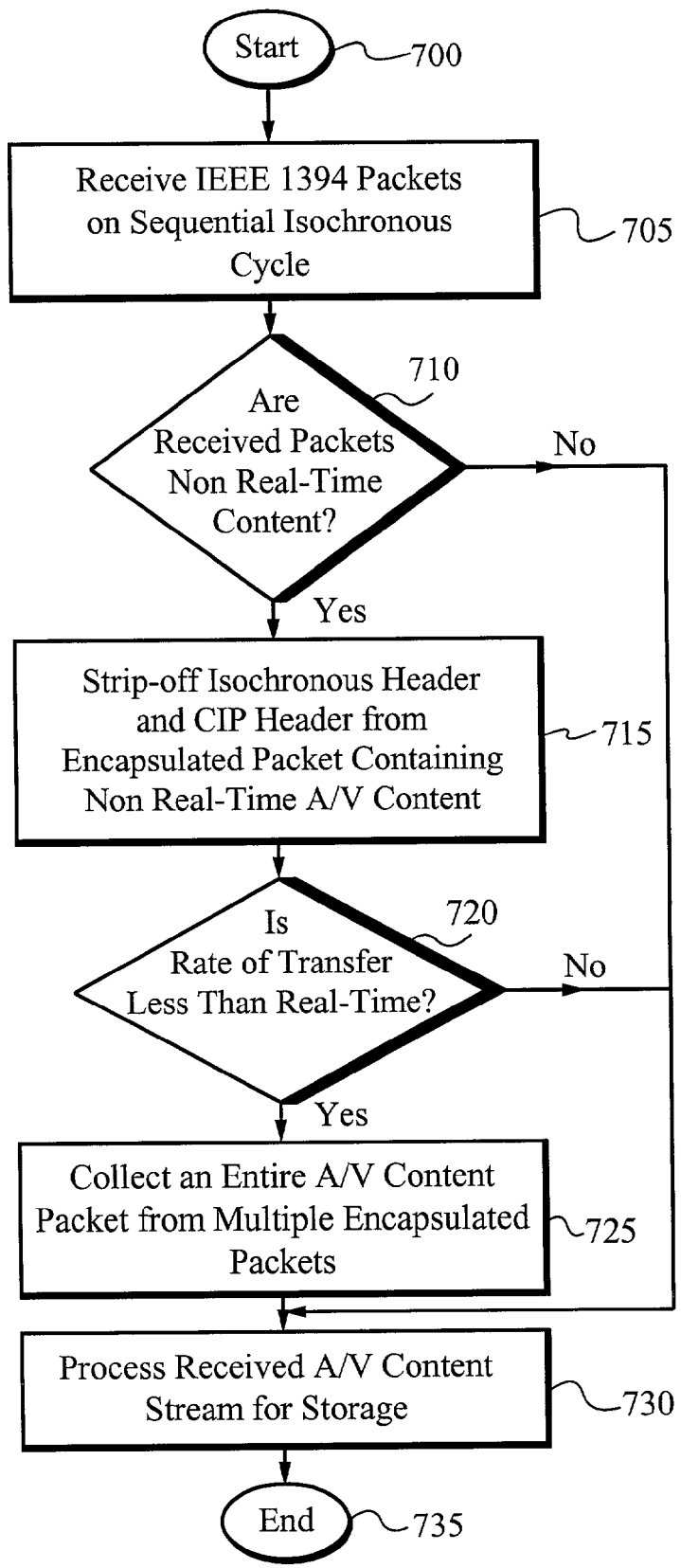
FIG. 9 illustrates a flowchart showing the preferred process of receiving A/V content in non real-time using isochronous data packets.

FIG. 9 illustrates a flowchart showing the preferred process of receiving A/V content in non real-time using isochronous data packets. The receiving process begins at the step 700. At the step 705, the non real-time IEEE 1394-2000 isochronous data packets are received on sequential isochronous cycles. At the step 710, it is determined if the received data packets are in the non real-time format. To make this determination, the fmt field in the IEC 61883 CIP header of the received data packet is read. If it is determined at the step 710 that the received data packet is in the non real-time format, then at the step 715 the non real-time IEEE 1394-2000 isochronous header and the non real-time IEC 61883 CIP header are stripped off the received data packet. At the step 720, it is determined if the rate of transfer of the received data packet is less than real-time. This determination is made by searching the data portion of the received data packet for an isochronous header. Since the data portion contains either a single real-time isochronous data packet containing partial packetized A/V content, or multiple real-time isochronous data packets each containing packetized A/V content, the located isochronous header corresponds to a real-time isochronous data packet. Once a real-time isochronous header is located, the data_length field of the located real-time isochronous header is read and compared to the data_length of the non real-time isochronous header of the received data packet. If the data_length of the non real-time isochronous header is less than the data_length of the real-time isochronous header, then the non real-time received data packet is transmitted at a speed less than real-time. In this case, only a portion of the necessary data is contained in the received data packet and the remainder of the necessary data needs to be obtained from subsequent received data packet(s) before a complete data packet can be processed. If it is determined at the step 720 that the received data packet is transmitted in less than real-time, then at the step 725, the remainder of the necessary data is obtained. The remainder of the necessary data is received by performing the steps 705 to 720 for one or more subsequent received data packets. The actual number of subsequent data packets required to obtain the necessary data to form a complete data packet is determined by the rate of transfer of the transmitted data packets. The complete data packet is a real-time IEEE 1394-2000 isochronous data packet. After a complete data packet is received at the step 725, or it is determined that the received data packet is in the real-time format at the step 710, or it is determined that the rate of transfer is not less than real-time at the step 720, then at the step 730, the real-time IEEE 1394-2000 isochronous data packet is processed and stored in a storage media using conventional A/V content stream processing of real-time IEEE 1394-2000 isochronous data packets. Preferably, the storage media is an audio/video hard disk drive (AVHDD), and the AVHDD stores the data as isochronous data packets. This provides the advantage of not having to format the data into isochronous data packets when there is a request to transmit the stored data on the AVHDD to another device. The receiving process ends at the step 735.

Transmission of isochronous data packets is no longer limited to real-time. Using the data transmission method of the present invention, isochronous data packets are communicated at speeds greater than or slower than real-time. When A/V data is communicated from one device to another device for purposes other than real-time viewing of the A/V data, the A/V data is packetized into isochronous data packets, thereby enabling copy protection, and communicated at faster than or slower than real-time speeds. Communicating the isochronous data packets at faster than real-time speeds eliminates the waiting that occurs with real-time transmissions. More specifically, when transmitting A/V data from a source device, for example a video camera or an AVHDD, to a destination device, for example another AVHDD, the transmission is completed faster using a transmission speed greater than real-time rather than using a conventional real-time transfer. When the amount of time to complete a data transfer is not important, communicating the isochronous data packets at slower than real-time uses less bandwidth, thereby freeing up bandwidth for other applications.

The present invention has been described in terms of specific embodiments incorporating details to facilitate the understanding of principles of construction and operation of the invention. Such reference herein to specific embodiments and details thereof is not intended to limit the scope of the claims appended hereto. It will be apparent to those skilled in the art that modifications may be made in the embodiment chosen for illustration without departing from the spirit and scope of the invention. Specifically, it will be apparent to those skilled in the art that while the preferred embodiment of the present invention is used with an IEEE 1394-2000 serial bus structure, the present invention could also be implemented on any other appropriate system bus structure. Additionally, it will also be apparent that while the preferred embodiment of the present invention transmits the non real-time isochronous data packets over an isochronous channel, the non real-time isochronous data packets can also be transmitted over asynchronous streams.

We claim:

1. A method of any speed dubbing using isochronous data packets comprising:
   a. configuring a transmitting plug on a transmitting device for transmitting isochronous data packets in non real-time;
   b. configuring a receiving plug on a receiving device for receiving the isochronous data packets received in non real-time;
   c. packetizing a data stream into the isochronous data packets configured for non real-time transmission, thereby forming a stream of non real-time isochronous data packets; and
   d. transmitting the non real-time isochronous data packets from the transmitting device via the transmitting plug to the receiving device via the receiving plug,
   wherein the stream of non real-time isochronous data packets is formed by packetizing the data stream into real-time isochronous data packets and encapsulating one or more real-time isochronous data packets within a non real-time header to form each non real-time isochronous data packet within the stream of non real-time isochronous data packets, further wherein the number of real-time isochronous data packets encapsulated within each non real-time isochronous data packet is associated with a non real-time transmission speed of the stream of non real-time isochronous data packets.

2. The method according to claim 1 wherein if the non real-time transmission speed is greater than real-time, then the non-real time transmission speed is a multiple of the real-time transmission speed and the number of real-time isochronous data packets encapsulated within each non real-time isochronous data packet corresponds to the multiple.

3. The method according to claim 1 wherein if the non real-time transmission speed is less than real-time then a single real-time isochronous data packet is encapsulated within each non real-time isochronous data packet such that only a portion of the data originally contained within the single real-time isochronous data packet is included within the encapsulated non real-time isochronous data packet, and a remaining portion of the data originally contained within the single real-time isochronous data packet is encapsulated in one or more subsequent non real-time isochronous data packets.

4. The method according to claim 1 wherein the non real-time header includes a non real-time isochronous header and a non real-time CIP header.

5. The method according to claim 4 wherein the non real-time isochronous header includes a data length field for indicating the amount of data contained within the non real-time isochronous data packet.

6. The method as claimed in claim 4 wherein the non real-time CIP header includes a format field for indicating that the non real-time isochronous data packet is formatted for non real-time data transfer.

7. The method according to claim 1 wherein the data stream includes audio/visual content data.

8. A method of any speed dubbing using isochronous data packets comprising:
   a. configuring a transmitting plug on a transmitting device for transmitting isochronous data packets in non real-time;
   b. configuring a receiving plug on a receiving device for receiving the isochronous data packets received in non real-time;
   c. packetizing a data stream into the isochronous data packets configured for non real-time transmission, thereby forming a stream of non real-time isochronous data packets; and
   d. transmitting the non real-time isochronous data packets from the transmitting device via the transmitting plug to the receiving device via the receiving plug, wherein the non real-time isochronous data packets are transmitted in non real-time over an isochronous channel.

9. The method according to claim 1 wherein the non real-time isochronous data packets are transmitted in non real-time over an asynchronous stream.

10. A method of transmitting isochronous data packets in non real-time comprising:
    a. configuring a source plug of a source device for transmitting isochronous data packets in non real-time;
    b. packetizing a data stream into real-time isochronous data packets;
    c. determining a transmission speed of the isochronous data packets to be transmitted;
    d. encapsulating a selective one of a partial real-time isochronous data packet and multiple real-time isochronous data packets within a non real-time isochronous data packet, wherein a number of encapsulated real-time isochronous data packets is based on the transmission speed; and
    e. transmitting the non real-time isochronous data packets via the source plug.

11. The method according to claim 10 wherein if the transmission speed is greater than real-time, then multiple real-time isochronous data packets are encapsulated within the non real-time isochronous data packet.

12. The method according to claim 10 wherein if the transmission speed is less than real-time, then a partial real-time isochronous data packet is encapsulated within the non real-time isochronous data packet and a remaining portion of the real-time isochronous data packet is encapsulated in one or more subsequent non real-time isochronous data packets.

13. The method according to claim 10 wherein each non real-time isochronous data packet includes a non real-time isochronous header and a non real-time CIP header.

14. The method according to claim 13 wherein the non real-time isochronous header includes a data length field for indicating the amount of data contained within the non real-time isochronous data packet.

15. The method as claimed in claim 13 wherein the non real-time CIP header includes a format field for indicating that the non real-time isochronous data packet is formatted for non real-time data transfer.

16. The method according to claim 10 wherein the data stream includes audio/visual content data.

17. The method according to claim 10 wherein the non real-time isochronous data packets are transmitted in non real-time over an isochronous channel.

18. The method according to claim 10 wherein the non real-time isochronous data packets are transmitted in non real-time over an asynchronous stream.

19. A method of receiving isochronous data packets in non real-time comprising:
    a. configuring a destination plug of a destination device for receiving isochronous data packets in non real-time;
    b. receiving isochronous data packets over the destination plug;
    c. determining a format of the received isochronous data packets;
    d. if the format indicates that the received isochronous data packets are non real-time isochronous data packets, then determining a transmission speed of the non real-time isochronous data packets;
    e. isolating a selective one of a partial real-time isochronous data packet and multiple real-time isochronous data packets encapsulated within the non real-time isochronous data packet, wherein a number of real-time isochronous data packets is based upon the transmission speed; and
    f. processing the real-time isochronous data packets.

20. The method according to claim 19 wherein if a partial real-time isochronous data packet is encapsulated within the non real-time isochronous data packet, then a remaining portion of the real-time isochronous data packet is encapsulated in one or more subsequent non real-time isochronous data packets, and the remaining portion is collected and aggregated with the partial real-time isochronous data packet before processing.

21. The method according to claim 19 wherein each non real-time isochronous data packet includes a non real-time isochronous header and a non real-time CIP header.

22. The method according to claim 21 wherein the non real-time isochronous header includes a data length field for indicating the amount of data contained within the non real-time isochronous data packet.

23. The method as claimed in claim 21 wherein the non real-time CIP header includes a format field for indicating that the non real-time isochronous data packet is formatted for non real-time data transfer.

24. The method according to claim 19 wherein the data stream includes audio/visual content data.

25. A method of configuring a plug to support non real-time streams of isochronous data packets comprising:
    a. embedding a non real-time plug transfer information block within a plug configuration information block;
    b. defining a non real-time information type within the non real-time plug transfer information block, wherein the non real-time information type indicates a non real-time stream of isochronous data packets;
    c. setting a bandwidth value within the non real-time plug transfer information block corresponding to a bus bandwidth of the non real-time stream of isochronous data packets;
    d. setting an enable field within the non real-time plug transfer information block to enable the plug to support non real-time streams of isochronous data packets; and
    e. configuring a plug using the non real-time plug transfer information block and communicating data packets.

26. An apparatus for communicating isochronous data packets in non real-time comprising:
    a. a configuring circuit to configure a plug to communicate isochronous data packets in non real-time;

b. a packetizing circuit to packetize a data stream into isochronous data packets configured for non real-time transmission, thereby forming a stream of non real-time isochronous data packets;

c. a transceiver circuit configured to communicate isochronous data packets in non realtime via the plug;

d. a de-packetizing circuit to extract one or more real-time isochronous data packets encapsulated within each non real-time isochronous data packet; and e. a controller coupled to the configuring circuit, the packetizing circuit, the transceiver circuit, and the de-packetizing circuit, wherein the controller processes the extracted real-time isochronous data packets.

27. The apparatus according to claim 26 wherein the stream of non real-time isochronous data packets is formed by packetizing the data stream into real-time isochronous data packets and encapsulating one or more real-time isochronous data packets within a non real-time header to form each non real-time isochronous data packet within the stream of non real-time isochronous data packets, further wherein the number of real-time isochronous data packets encapsulated within each non real-time isochronous data packet is associated with a non real-time transmission speed of the stream of non real-time isochronous data packets.

28. The apparatus according to claim 27 wherein if the non real-time transmission speed is greater than real-time, then the non-real time transmission speed is a multiple of the real-time transmission speed and the number of real-time isochronous data packets encapsulated within each non real-time isochronous data packet corresponds to the multiple.

29. The apparatus according to claim 27 wherein if the non real-time transmission speed is less than real-time then a single real-time isochronous data packet is encapsulated within each non real-time isochronous data packet such that only a portion of the data originally contained within the single real-time isochronous data packet is included within the encapsulated non real-time isochronous data packet, and a remaining portion of the data originally contained within the single real-time isochronous data packet is encapsulated in one or more subsequent non real-time isochronous data packets.

30. The apparatus according to claim 27 wherein the non real-time header includes a non real-time isochronous header and a non real-time CIP header.

31. The apparatus according to claim 30 wherein the non real-time isochronous header includes a data length field for indicating the amount of data contained within the non real-time isochronous data packet.

32. The apparatus as claimed in claim 30 wherein the non real-time CIP header includes a format field for indicating that the non real-time isochronous data packet is formatted for non real-time data transfer.

33. The apparatus according to claim 26 wherein the data stream includes audio/visual content data.

34. The apparatus according to claim 26 wherein the non real-time isochronous data packets are transmitted in non real-time over an isochronous channel.

35. The apparatus according to claim 26 wherein the non real-time isochronous data packets are transmitted in non real-time over an asynchronous stream.

36. The apparatus according to claim 26 wherein if a partial real-time isochronous data packet is encapsulated within the non real-time isochronous data packet, then a remaining portion of the real-time isochronous data packet is encapsulated in one or more subsequent non real-time isochronous data packets, and the remaining portion is collected and aggregated with the partial real-time isochronous data packet before processing.

37. The apparatus according to claim 26 wherein the transceiver circuit is configured to transmit isochronous data packets in non real-time via the plug.

38. The apparatus according to claim 26 wherein the transceiver circuit is configured to receive isochronous data packets in non real-time via the plug.

39. An apparatus for communicating isochronous data packets in non real-time comprising:

a. means for configuring a plug to communicate isochronous data packets in non real-time;

b. means for packetizing a data stream into isochronous data packets configured for non real-time transmission; thereby forming a stream of non real-time isochronous data packets;

c. means for communicating isochronous data packets in non real-time via the plug;

d. means for extracting one or more real-time isochronous data packets encapsulated within each non real-time isochronous data packet, wherein a number of real-time isochronous data packets is based upon the transmission speed; and e. means for controlling coupled to the means for configuring, the means for packetizing, the means for communicating, and the means for de-packetizing, wherein the means for controlling processes the extracted real-time isochronous data packets.

40. The apparatus according to claim 39 wherein the stream of non real-time isochronous data packets is formed by packetizing the data stream into real-time isochronous data packets and encapsulating one or more real-time isochronous data packets within a non real-time header to form each non real-time isochronous data packet within the stream of non real-time isochronous data packets, further wherein the number of real-time isochronous data packets encapsulated within each non real-time isochronous data packet is associated with a non real-time transmission speed of the stream of non real-time isochronous data packets.

41. The apparatus according to claim 40 wherein if the non real-time transmission speed is greater than real-time, then the non-real time transmission speed is a multiple of the real-time transmission speed and the number of real-time isochronous data packets encapsulated within each non real-time isochronous data packet corresponds to the multiple.

42. The apparatus according to claim 40 wherein if the non real-time transmission speed is less than real-time then a single real-time isochronous data packet is encapsulated within each non real-time isochronous data packet such that only a portion of the data originally contained within the single real-time isochronous data packet is included within the encapsulated non real-time isochronous data packet, and a remaining portion of the data originally contained within the single real-time isochronous data packet is encapsulated in one or more subsequent non real-time isochronous data packets.

43. The apparatus according to claim 40 wherein the non real-time header includes a non real-time isochronous header and a non real-time CIP header.

44. The apparatus according to claim 43 wherein the non real-time isochronous header includes a data length field for indicating the amount of data contained within the non real-time isochronous data packet.

45. The apparatus as claimed in claim 43 wherein the non real-time CIP header includes a format field for indicating that the non real-time isochronous data packet is formatted for non real-time data transfer.

46. The apparatus according to claim 39 wherein the data stream includes audio/visual content data.

47. The apparatus according to claim 39 wherein the non real-time isochronous data packets are transmitted in non real-time over an isochronous channel.

48. The apparatus according to claim 39 wherein the non real-time isochronous data packets are transmitted in non real-time over an asynchronous stream.

49. The apparatus according to claim 39 wherein if a partial real-time isochronous data packet is encapsulated within the non real-time isochronous data packet, then a remaining portion of the real-time isochronous data packet is encapsulated in one or more subsequent non real-time isochronous data packets, and the remaining portion is collected and aggregated with the partial real-time isochronous data packet before processing.

50. The apparatus according to claim 39 wherein the means for communicating is configured to transmit isochronous data packets in non real-time via the plug.

51. The apparatus according to claim 39 wherein the means for communicating is configured to receive isochronous data packets in non real-time via the plug.

* * * * *